(12) United States Patent
Sela et al.

(10) Patent No.: US 11,303,667 B2
(45) Date of Patent: Apr. 12, 2022

(54) ORGANIZATION ATTACK SURFACE MANAGEMENT

(71) Applicant: Illusive Networks Ltd., Tel Aviv (IL)

(72) Inventors: Tom Sela, Tel Aviv (IL); Tom Kahana, Gan Yavne (IL); Dolev Ben-Shushan, Netanya (IL); Hadar Yudovich, Givataim (IL); Gabi Katz, Rishon Letzion (IL); Tomer Shamul, Jerusalem (IL); Gil Shulman, Ramat Gan (IL); Matan Kubovsky, Tel Aviv (IL); Lee Abe Teichner, Tel Aviv (IL)

(73) Assignee: ILLUSIVE NETWORKS LTD, Tel Aviv (IL)

( * ) Notice: Subject to any disclaimer, the term of this patent is extended or adjusted under 35 U.S.C. 154(b) by 254 days.

(21) Appl. No.: 16/391,322

(22) Filed: Apr. 23, 2019

(65) Prior Publication Data
US 2019/0334928 A1    Oct. 31, 2019

Related U.S. Application Data

(60) Provisional application No. 62/662,225, filed on Apr. 25, 2018.

(51) Int. Cl.
*H04L 29/06* (2006.01)
*H04L 12/24* (2006.01)
*H04L 41/12* (2022.01)

(52) U.S. Cl.
CPC ............ *H04L 63/145* (2013.01); *H04L 41/12* (2013.01); *H04L 63/0263* (2013.01); *H04L 63/102* (2013.01); *H04L 63/1416* (2013.01); *H04L 63/20* (2013.01)

(58) Field of Classification Search
CPC ... H04L 63/145; H04L 41/12; H04L 63/0263; H04L 63/102; H04L 63/1416; H04L 63/20
See application file for complete search history.

(56) References Cited

U.S. PATENT DOCUMENTS 10,044,745 B1 *   8/2018   Jones ................. H04L 63/1425
10,169,571 B1 *   1/2019   Attfield ................. G06F 21/50
(Continued)

*Primary Examiner* — Jason Chiang
(74) *Attorney, Agent, or Firm* — Soquel Group I.P Ltd

(57) ABSTRACT

A system for sanitizing an organization's network against attacker breach, including a data collector, gathering information about network hosts, an analyzer constructing the organization's network topology, a machine learning engine categorizing the hosts into organizational units and identifying key assets of the organization, a security rules engine mapping real-time data, and inferring security rules that prescribe on which specific hosts which specific credentials are permitted to be stored, and a user interface including an analyst dashboard enabling an analyst to visualize in real-time activities within the organizations' network, to automatically infer security rules for the network, to activate the security rules in the network, and to eliminate potential attack vectors for which the activated security rules are violated, and an attacker view visualizing the organization's network, identifying security rule violations across the organization's network, and enabling removal of credential-based security rule violations by use of actions.

18 Claims, 12 Drawing Sheets

(56) References Cited

U.S. PATENT DOCUMENTS

| | | | |
|---|---|---|---|
| 2003/0212909 A1* | 11/2003 | Chandrashekhar | G06F 21/577 726/25 |
| 2003/0217039 A1* | 11/2003 | Kurtz | G02B 6/12023 |
| 2004/0015728 A1* | 1/2004 | Cole | H04L 63/145 726/23 |
| 2005/0138413 A1* | 6/2005 | Lippmann | G06F 21/577 726/4 |
| 2005/0193430 A1* | 9/2005 | Cohen | G06F 21/577 726/25 |
| 2005/0278778 A1* | 12/2005 | D'Agostino | G06F 1/1626 726/5 |
| 2011/0277034 A1* | 11/2011 | Hanson | H04L 63/1433 726/25 |
| 2012/0180133 A1* | 7/2012 | Al-Harbi | H04L 63/1433 726/25 |
| 2014/0007241 A1* | 1/2014 | Gula | H04L 63/1433 726/25 |
| 2014/0067779 A1* | 3/2014 | Ojha | G06F 16/1734 707/694 |
| 2015/0128205 A1* | 5/2015 | Mahaffey | H04L 63/105 726/1 |
| 2016/0191532 A1* | 6/2016 | Seiver | H04L 63/101 726/4 |
| 2017/0048215 A1* | 2/2017 | Straub | H04L 63/06 |
| 2018/0027006 A1* | 1/2018 | Zimmermann | G06F 9/46 726/11 |
| 2018/0054429 A1* | 2/2018 | Donahue | H04L 63/1475 |
| 2018/0075081 A1* | 3/2018 | Chipman | G06Q 20/367 |
| 2018/0084012 A1* | 3/2018 | Joseph | H04L 63/1425 |
| 2018/0191726 A1* | 7/2018 | Luukkala | H04L 63/0823 |

\* cited by examiner

ORGANIZATION ATTACK SURFACE MANAGEMENT

CROSS REFERENCES TO RELATED APPLICATIONS

This application is a non-provisional of U.S. Provisional Application No. 62/662,225, entitled ORGANIZATION ATTACK SURFACE MANAGEMENT, and filed on Apr. 25, 2018 by inventors Tom Sela, Tom Kahana, Dolev Ben-Shushan, Hadar Yudovich, Gabi Katz, Tomer Shamul, Gil Shulman, Matan Kubovsky and Lee Abe Teichner, the contents of which are hereby incorporated herein in their entirety.

FIELD OF THE INVENTION

The present invention relates to mitigating an organization's computer network attack vulnerabilities in a pre-breach stage.

BACKGROUND OF THE INVENTION

Reference is made to FIG. 1, which is a simplified diagram of a prior art organization network 100 connected to an external internet 10. Network 100 is shown generally with resources including computers 110, databases 120, switches and routers 130, and mobile devices 140 such as smart phones and tablets, for ease of presentation, although it will be appreciated by those skilled in the art that organization networks today are generally much more complex and include other devices such as printers, other types of network elements such as relays, and many Internet of Things objects. The various connections shown in FIG. 1 may be direct or indirect, wired or wireless communications, or a combination of wired and wireless connections. Computers 110 and databases 120 may be physical elements or logical elements, or a mix of physical and logical elements. Computers 110 and databases 120 may be virtual machines. Computers 110 and databases 120 may be local, remote or cloud-based elements, or a mix of local, remote and cloud-based elements. Computers 110 may be client workstation computers, or server computers including inter alia file transfer protocol (FTP) servers, email servers, structured query language (SQL) servers, secure shell (SSH) servers and other application servers, or a mix of client and server computers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing computers 110 and databases 120 include inter alia server account credentials such as <address> <username> <password> for an FTP server, an SQL server, or an SSH server. Credentials for accessing computers 110 and databases 120 also include user login credentials<username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Credentials also include access keys, such as SSH keys. Background information about the Kerberos protocol and the LM hash is available at Wikipedia.

Access governor 150 may maintain a directory of computers 110, databases 120 and their users. Access governor 150 authorizes users and computers, assigns and enforces security policies, and installs and updates software. When a user logs into a computer 110, access governor 150 checks the submitted password, and determines if the user is an administrator (admin), a normal user (user) or another user type.

Computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between organization network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology and organization structure, learns "where can I go from my current step" and "how can I go from my current step (privileged required)", and learns implemented security solutions, and then operates in accordance with that data. One method to defend against such attacks, termed "honeypots", is to plant and monitor misleading information/decoys/bait, with the objective of the attacker learning of their existence and then consuming those bait resources, and to notify an administrator of the malicious activity. Background information about honeypots is available at Wikipedia.

Conventional honeypot systems operate by monitoring access to a supervised element in a computer network. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

An advanced attacker may use different attack techniques to enter a corporate network and to move laterally within the network in order to obtain his resource goals. The advanced attacker may begin with a workstation, server or any other network entity to start his lateral movement. He uses different methods to enter the first network node, including inter alia social engineering, existing exploit and/or vulnerability that he knows to exercise, and a Trojan horse or any other malware allowing him to control the first node.

Reference is made to FIG. 2, which is a simplified diagram of organization network 100 with attack vectors of an attacker at an early stage of lateral movement. Once an attacker has taken control of a first node in a corporate network, he uses different advanced attack techniques for orientation and propagation and discovery of additional ways to reach other network nodes in the corporate network. Attacker movement from node to node is performed via an "attack vector", which is an object in memory or storage of a first computer that may be used to access a second computer.

Exemplary attack vectors include inter alia credentials of users with enhanced privileges, existing share names on different servers, and details of an FTP server, an email server, an SQL server or an SSH server and its credentials. Attack vectors are often available to an attacker because a user did not logoff his workstation or clear his cache. E.g., if a user contacted a help desk and gave the help desk remote access to his workstation and did not logoff his workstation, then the help desk access credentials may still be stored in the user's local cache and available to the attacker. Similarly, if the user accessed an FTP server, then the FTP account login parameters may be stored in the user's local cache or profile and available to the attacker.

Attack vectors enable inter alia a move from workstation A 4 server B based on a shared name and its credentials, connection to a different workstation using local admin credentials that reside on a current workstation, and connection to an FTP server using specific access credentials.

Reference is made to FIG. 3, which is a simplified diagram of organization network 100 with attack paths of an attacker at a later stage of lateral movement. Whereas IT "sees" the logical and physical network topology, an attacker that lands on the first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "maximal attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network node that is of value to the attacker and is his "attack goal node".

When the attacker lands on the first node, but does not know how to reach the attack goal node, he generates a current attack map that leads to the attack goal node.

SUMMARY

There is thus provided in accordance with an embodiment of the present invention a system for sanitizing an organization's network against attacker breach, including a data collector, gathering information about network hosts, an analyzer constructing the organization's network topology, a machine learning engine categorizing the hosts into organizational units and identifying key assets of the organization, a security rules engine mapping real-time data, and inferring security rules that prescribe on which specific hosts which specific credentials are permitted to be stored, and a user interface including an analyst dashboard enabling an analyst to visualize in real-time activities within the organizations' network, to automatically infer security rules for the network, to activate the security rules in the network, and to eliminate potential attack vectors for which the activated security rules are violated, and an attacker view visualizing the organization's network, identifying security rule violations across the organization's network, and enabling removal of credential-based security rule violations by use of actions.

There is additionally provided in accordance with an embodiment of the present invention a method for sanitizing an organization's network against attacker breach, including gathering information about network hosts, including endpoint computers and server computers within an organization's network, and about credentials stored on these computers, applying graph theory to construct the organization's network topology and connections between hosts, and to depict hosts that have credentials stored therein, categorizing the hosts into users, groups and organizational units, and identifying key assets of the organization, mapping real-time data collected from said gathering information, analyzed by the applying graph theory and categorized by the categorizing, inferring security rules that prescribe on which specific hosts which specific credentials are permitted to be stored, simulating the inferred security rules for existing network data offline, implementing production versions of the simulated security rules, generating a report of all changes applied by security rule implementation, and all security rule violations that have been eliminated, and enabling an analyst (i) to visualize in real-time activities within the organizations' network, (ii) to automatically infer security rules for the network, (iii) to activate the security rules in the network, and (iv) to eliminate potential attack vectors for which the activated security rules are violated, and visualizing the endpoints and the servers within the organization's network, representing connections by protocol and by credentials within the network, visualizing real and deceptive connections within the network, identifying security rule violations across the organization's network, and enabling removal of credential-based security rule violations by use of actions.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 10 | Internet |
| 100 | organization network |
| 110 | network computers |
| 120 | network databases |
| 130 | network switches and routers |
| 140 | mobile devices |
| 150 | access governor (optional) |
| 160 | SIEM server |
| 170 | DNS server |
| 180 | firewall |
| 200 | organization network with network surveillance |
| 210 | deception management server |
| 211 | policy manager |
| 212 | deployment module |
| 213 | forensic application |
| 220 | database of credential types |
| 230 | policy database |
| 240 | decoy servers |
| 241 | tar-pit modules |
| 242 | forensic alert module |
| 250 | update server |
| 300 | attack surface management (ASM) module |

| Table of elements in the figures | |
|---|---|
| Element | Description |
| 310 | data collector |
| 320 | analyzer |
| 330 | machine learning engine |
| 340 | rules engine |
| 341-344 | rules |
| 350 | action engine |
| 360 | notification engine |
| 370 | analyst dashboard |
| 371-375 | security rule violations |
| 380 | attacker view |
| 371 | security rule violation |

Elements numbered in the 1000's are operations of flow charts.

DETAILED DESCRIPTION

In accordance with embodiments of the present invention, systems and methods are provided for creating, deploying and managing augmentation to an attacker's current attack map. These systems and methods define decoy attack vectors that change the current attack map, and detect the attacker when he follows an attack vector that leads to a decoy network node.

Figure 1:
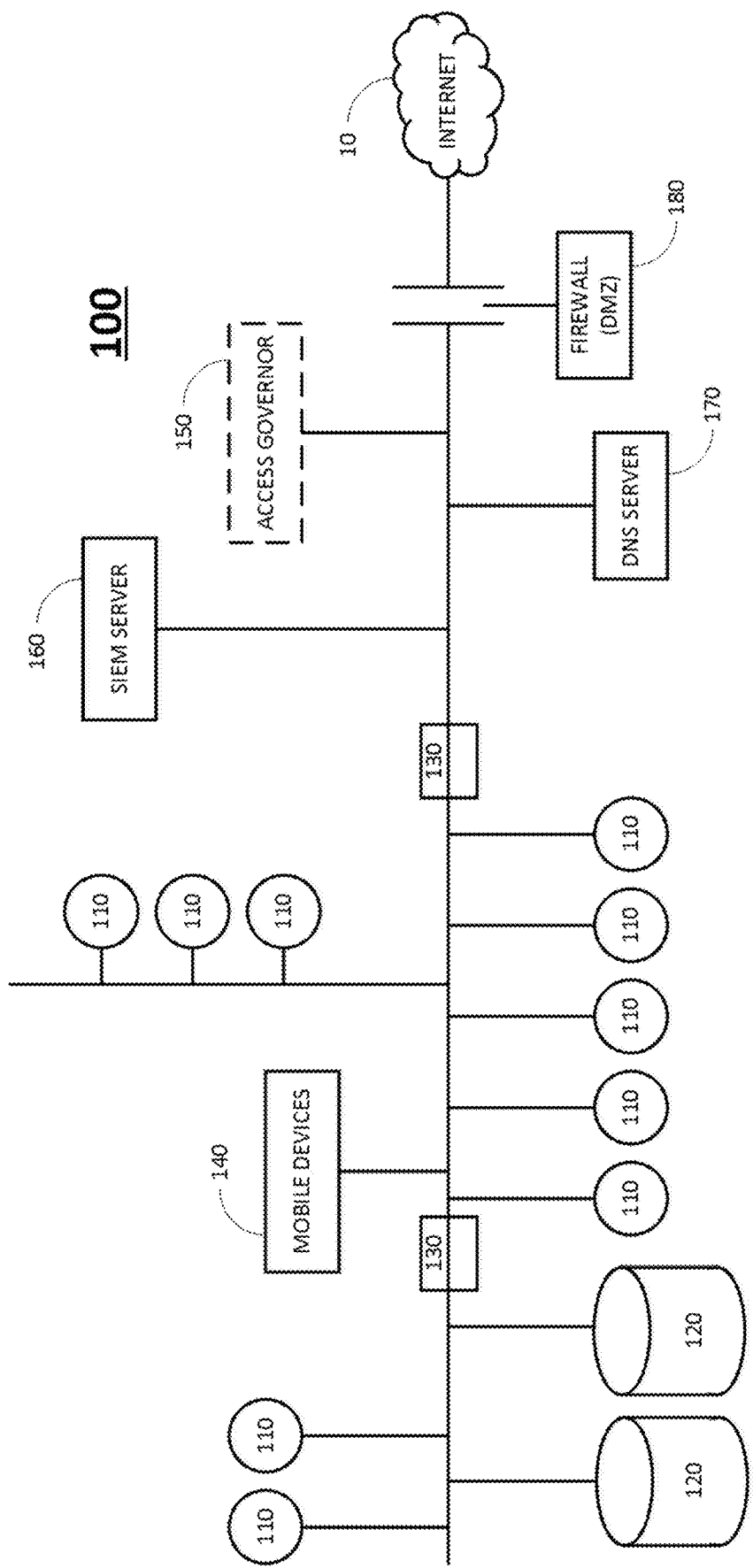
FIG. 1 is a simplified diagram of a prior art organization network connected to an external internet.
Figure 2:
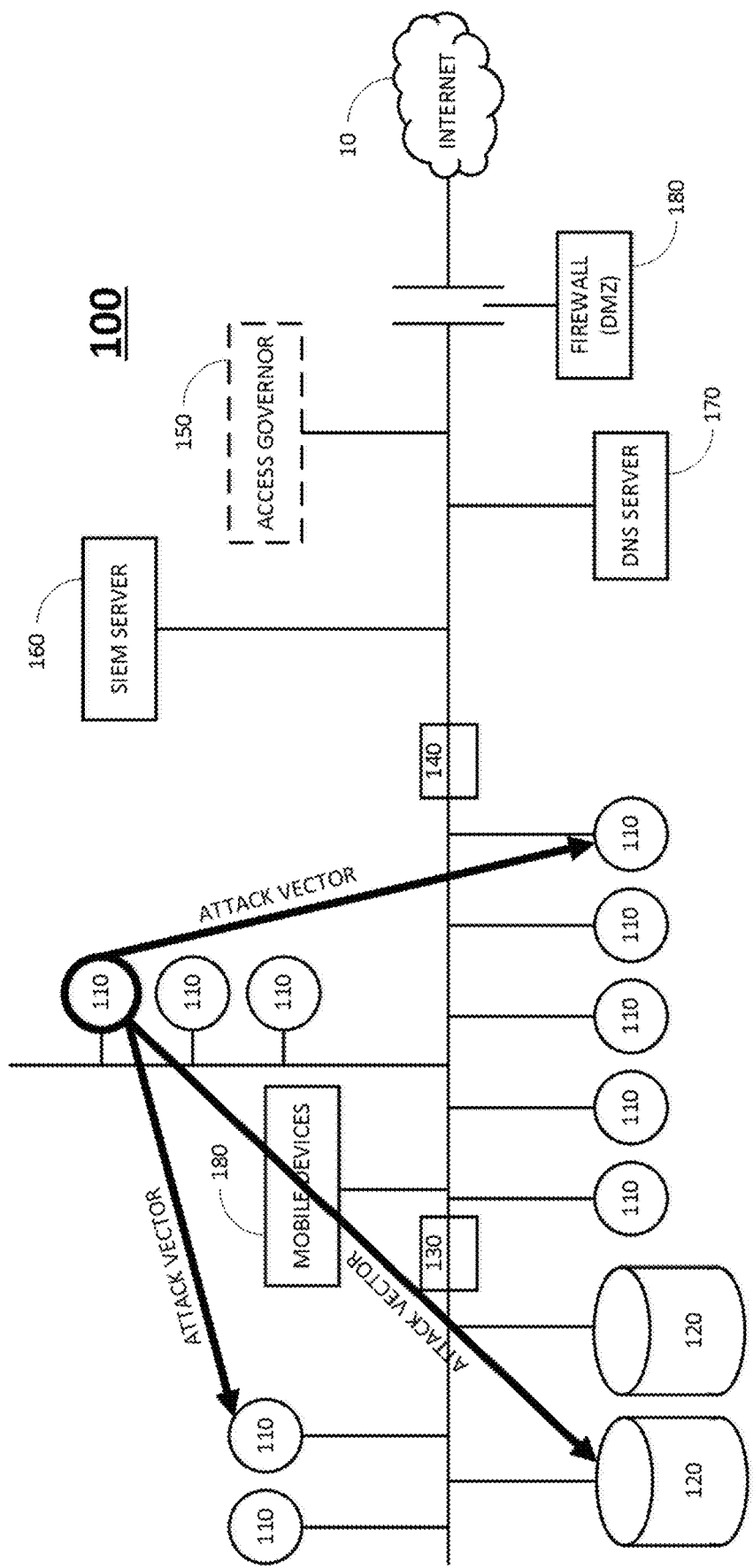
FIG. 2 is a simplified diagram of a prior art organization network with attack vectors of an attacker at an early stage of lateral movement.
Figure 3:
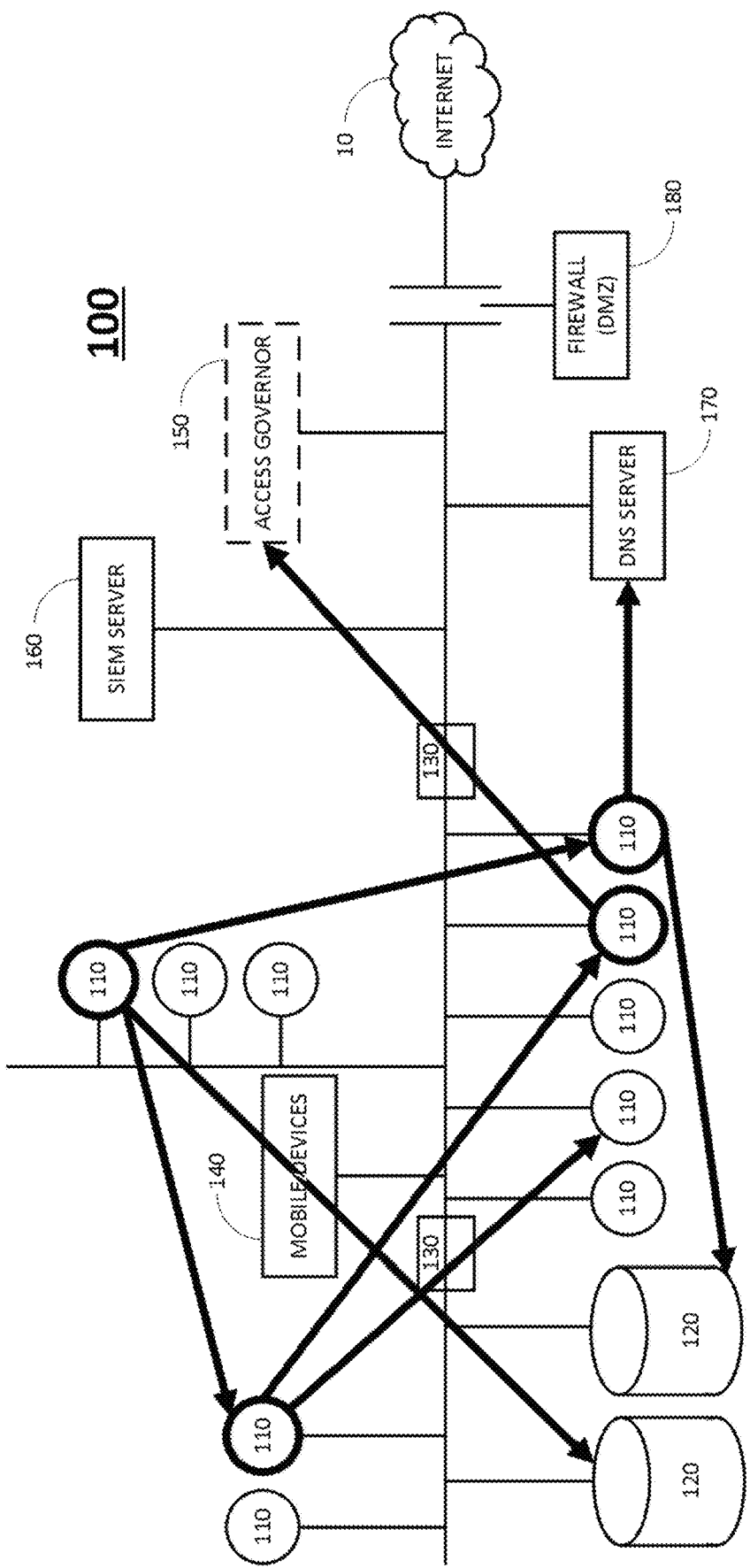
FIG. 3 is a simplified diagram of a prior art organization network with attack paths of an attacker at a later stage of lateral movement.
Figure 4:
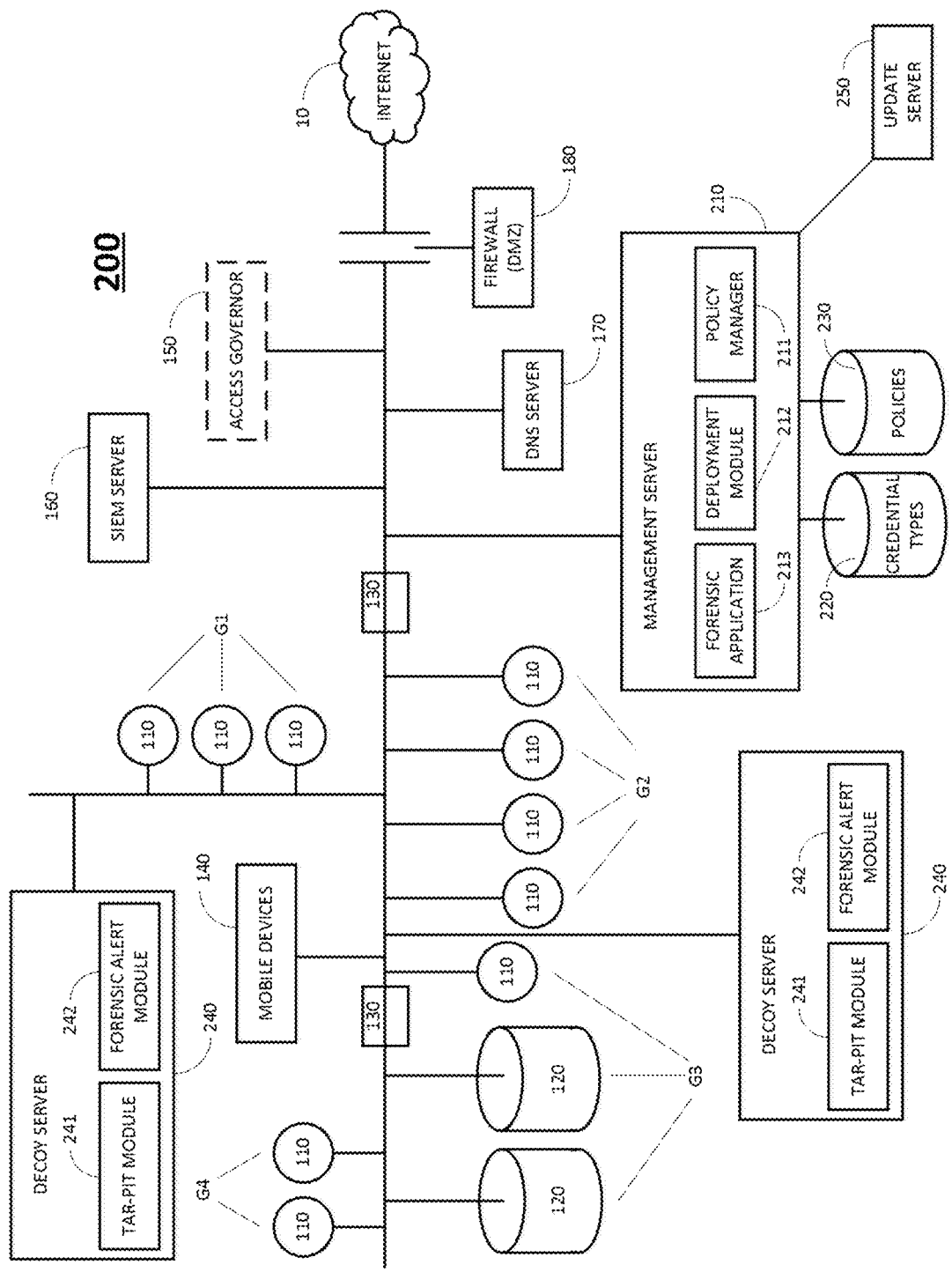
FIG. 4 is a simplified diagram of an organization network with network surveillance, in accordance with an embodiment of the present invention.

Reference is made to FIG. 4, which is a simplified diagram of an organization network 200 with network surveillance, in accordance with an embodiment of the present invention. Network 200 includes a deception management server 210, a database 220 of decoy attack vectors, a policy database 230 and decoy servers 240. In addition, network computers 110 and databases 120 are grouped into groups G1, G2, G3 and G4.

Database 220 stores attack vectors that fake movement and access to computers 110, databases 120 and other resources in network 200. Attack vectors include inter alia:
user credentials of the form<username> <password>
user credentials of the form<username> <hash of password>
user credentials of the form<username> <ticket>
FTP server credentials of the form<address> <username> <password>
SSH server credentials of the form<address> <username> <password>

The attack vectors stored in database 220 are categorized by families, such as inter alia F1—user credentials
F2—connections
F3—FTP logins
F4—SSH logins
F5—share names
F6—databases
F7—network devices
F8—URLs
F9—Remote Desktop Protocol (RDP)
F10—recent command
F11—scanners Credentials for a computer B that reside on a computer A provide an attack vector for an attacker from computer A→computer B.

Database 220 communicates with an update server 250, which updates database 220 as attack vectors for accessing, manipulating and hopping to computers evolve over time.

Policy database 230 stores, for each group of computers, G1, G2, . . . , policies for planting decoy attack vectors in computers of that group. Each policy specifies decoy attack vectors that are planted in each group, in accordance with attack vectors stored in database 220. For user credentials, the decoy attack vectors planted on a computer lead to another resource in the network. For attack vectors to access an FTP or other server, the decoy attack vectors planted on a computer lead to a decoy server 240.

It will be appreciated by those skilled in the art that databases 220 and 230 may be combined into a single database, or distributed over multiple databases.

Deception management server 210 includes a policy manager 211, a deployment module 212, and a forensic application 213. Policy manager 211 defines decoy and response policies. A decoy and response policy defines different decoy types, different decoy combinations, response procedures, notification services, and assignments of the policy to specific network nodes, network users, groups of nodes or users or both. Once policies are defined, they are stored in policy database 230 with the defined assignments.

Deception management server 210 obtains the policies and their assignments from policy database 230, and delivers them to appropriate nodes and groups. It then launches deployment module 212 to plant decoys in end points, servers, applications, routers, switches, relays and other entities in the network. Deployment module 212 plants each decoy, based on its type, in memory (RAM), disk, or in any other data or information storage area, as appropriate. Deployment module 212 plants the decoy attack vectors in such a way that the chances of a valid user accessing the decoy attack vectors are low. Deployment module 212 may or may not stay resident.

Forensic application 213 is a real-time application that is transmitted to a destination computer in the network, when a decoy attack vector is accessed by a computer 110. When forensic application 213 is launched on the destination computer, it identifies a process running within that computer 110 that accessed that decoy attack vector, logs the activities performed by the thus-identified process in a forensic report, and transmits the forensic report to deception management server 210.

Once an attacker is detected, a "response procedure" is launched. The response procedure includes inter alia various notifications to various addresses, and actions on a decoy server such as launching an investigation process, and isolating, shutting down and re-imaging one or more network nodes. The response procedure collects information available on one or more nodes that may help in identifying the attacker's attack acts, attention and progress.

Each decoy server 240 includes a tar-pit module 241, which is a process that purposely delays incoming connections, thereby providing additional time for forensic application 213 to launch and log activities on a computer 110 that is accessing the decoy server. Each decoy server 240 also includes a forensic alert module 242, which alerts management system 210 that an attacker is accessing the decoy server via a computer 110 of the network, and causes deception management server 210 to send forensic application 213 to the computer that is accessing the decoy server. In an alternative embodiment of the present invention, decoy server 240 may store forensic application 213, in which case decoy server 240 may transmit forensic application 213 directly to the computer that is accessing the decoy server. In another alternative embodiment of the present invention, deception management server 210 or decoy server 240 may transmit forensic application 213 to a destination computer other than the computer that is accessing the decoy server.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or such other analytics.

Figure 5:
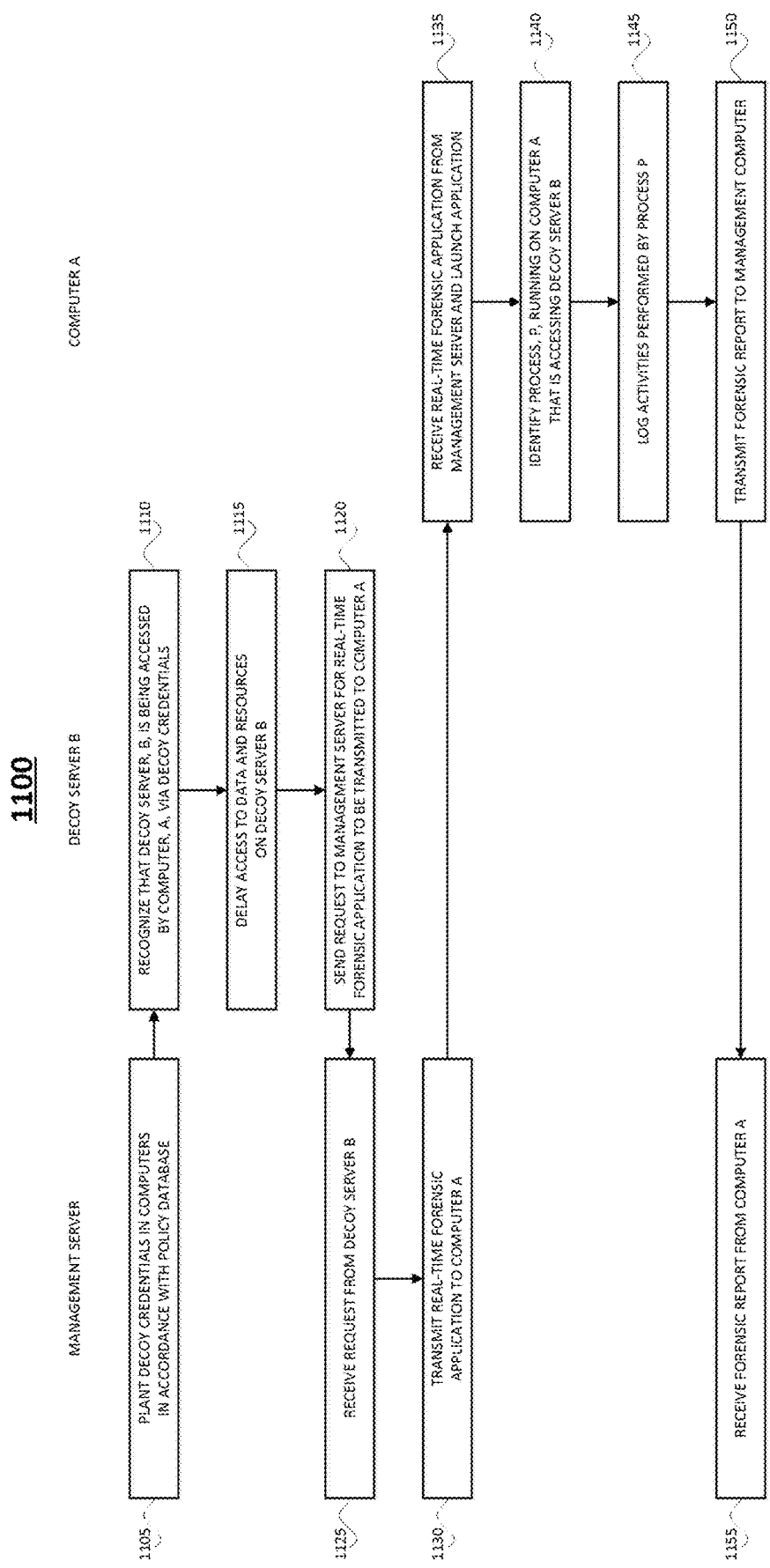
FIG. 5 is a simplified flowchart of a method for network surveillance and notification using decoy servers, in accordance with an embodiment of the present invention.

Reference is made to FIG. 5, which is a simplified flowchart of a method 1100 for network surveillance and notification using decoy servers, in accordance with an embodiment of the present invention. The flowchart of FIG. 5 is divided into three columns. The leftmost column includes operations performed by deception management server 210. The middle column includes operations performed by a decoy server B that is accessed from a computer A using decoy attack vectors. The rightmost column includes operations performed by computer A.

At operation 1105, deployment module 212 plants decoy attack vectors in computers 110 in accordance with the policies in database 230. At operation 1110 decoy server B recognizes that it is being accessed from a computer A via a decoy attack vector. At operation 1115, tar-pit module 241 of decoy server B delays access to data and resources on decoy server B. The delaying performed at operation 1115 provides additional time for decoy server B to send a request to deception management server 210 to transmit forensic application 213 to computer A, and for computer A to receive and run forensic application 213. At operation 1120, decoy server B sends a request to deception management server 210, to transmit real-time forensic application 213 to computer A.

At operation 1125, deception management server 210 receives the request sent by decoy server B, and at operation 1130 deception management server 210 transmits forensic application 213 to computer A.

At operation 1135, computer A receives forensic application 213 from deception management server 210, and launches the application. At operation 1140, forensic application 213 identifies a process, P, running on computer A that is accessing decoy server B. At operation 1145, forensic application 213 logs activities performed by process P. At operation 1150, forensic application 213 transmits a forensic report to deception management server 210. Finally, at operation 1155, deception management server 210 receives the forensic report from computer A.

In accordance with an alternative embodiment of the present invention, decoy server B may store forensic application 213, in which case decoy server B may transmit forensic application 213 directly to computer A, and operations 1120, 1125 and 1130 can be eliminated.

In accordance with another alternative embodiment of the present invention, forensic application 213 is transmitted by deception management server 210 or by decoy server B to a destination computer other than computer A. When the destination computer launches forensic application 213, the application communicates with computer A to identify the process, P, running on computer A that is accessing decoy server B, to log the activities performed by process P, and to transmit the forensic report to deception management server 210

Figure 6:
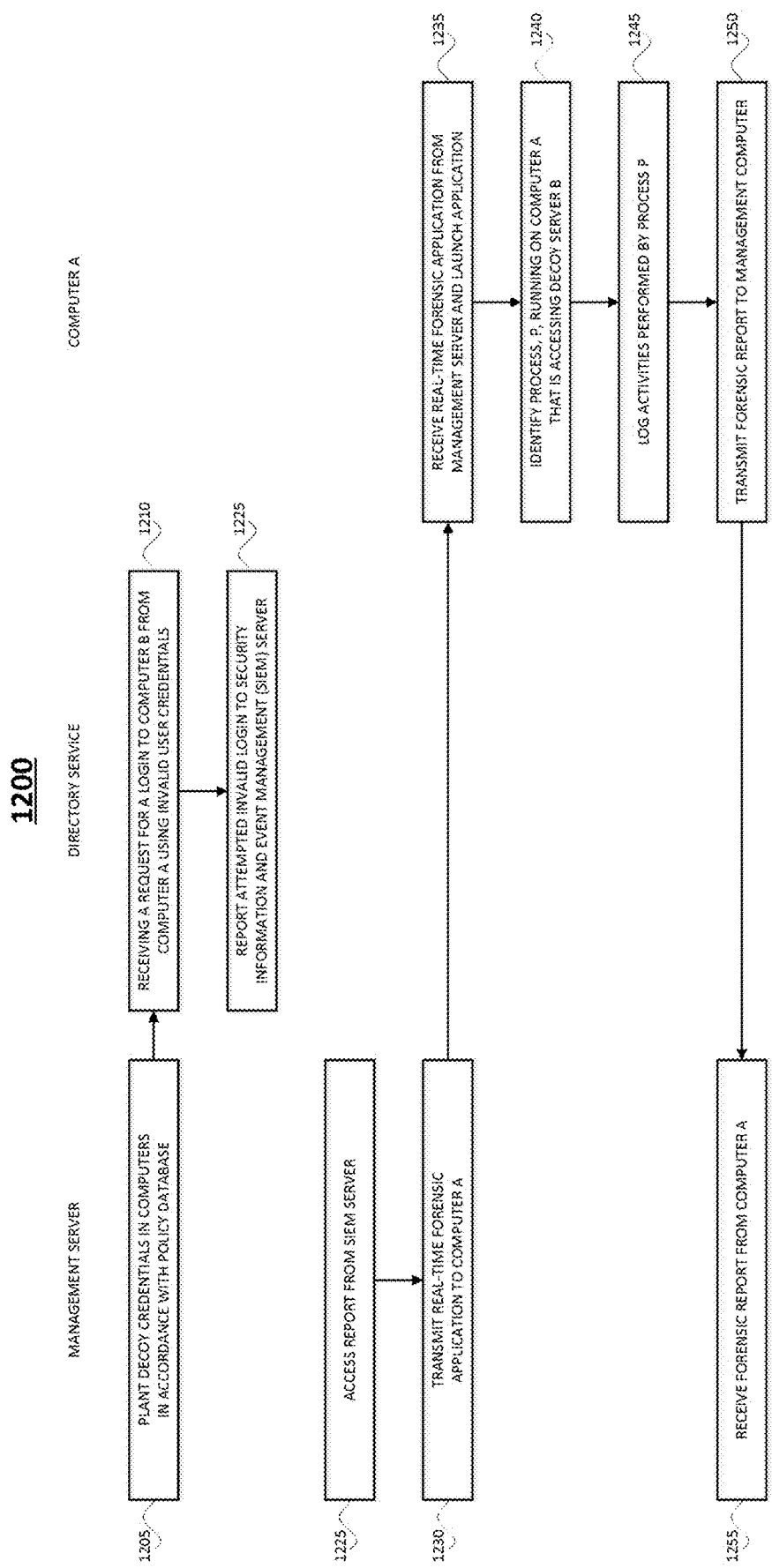
FIG. 6 is a simplified method for network surveillance and notification using decoy user credentials, in accordance with an embodiment of the present invention.

Reference is made to FIG. 6, which is a simplified method for network surveillance and notification using decoy user credentials, in accordance with an embodiment of the present invention. The flowchart of FIG. 6 is divided into three columns. The leftmost column includes operations performed by deception management server 210. The middle column includes operations performed by access governor 150. The rightmost column includes operations performed by a computer A that attempts to login to a computer B using decoy user credentials.

At operation 1205, deployment module 212 plants decoy credentials in computers 110 in accordance with the policies in database 230. At operation 1210 access governor 150 receives an authorization request from a computer B for a login to a computer A using invalid user credentials. At operation 1215 access governor 150 reports the attempted invalid login to SIEM server 160.

At operation 1225, deception management server 210 identifies an invalid login attempt event reported by SIEM server 160, and at operation 1230 deception management server 210 transmits real-time forensic application 213 to computer A.

At operation 1235, computer A receives forensic application 213 from deception management server 210, and launches the application. At operation 1240, forensic application 213 identifies a process, P, running on computer A that is accessing computer B. At operation 1245, forensic application 213 logs activities performed by process P. At operation 1250, forensic application 213 transmits a forensic report to deception management server 210. Finally, at operation 1255, deception management server 210 receives the forensic report from computer A.

In accordance with an alternative embodiment of the present invention, forensic application 213 is transmitted by deception management server 210 to a destination computer other than computer A. When the destination computer launches forensic application 213, the application communicates with computer A to identify the process, P, running on computer A that is accessing computer B, to log the activities performed by process P, and to transmit the forensic report to deception management server 210

As mentioned above, conventional honeypot systems generate many false alerts. Embodiments of the present invention enhance confidence levels in identifying an attacker, by luring him into multiple access attempts to different resources monitored by the system.

Figure 7:
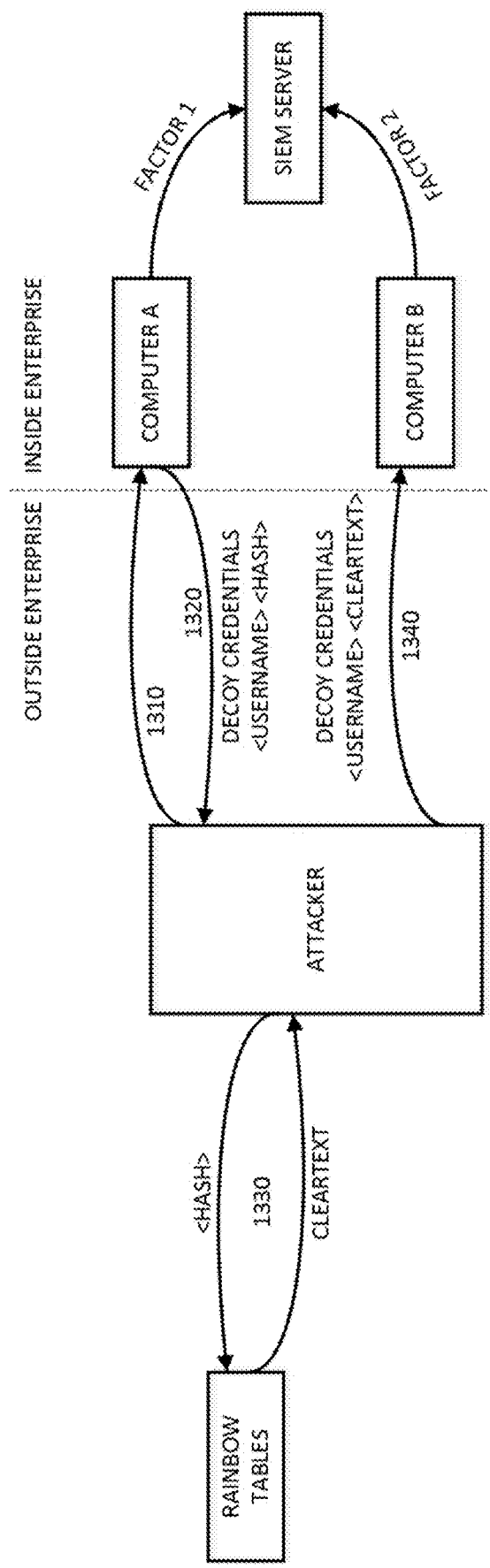
FIG. 7 is a simplified diagram of a method for network surveillance using two-factor deception, in accordance with an embodiment of the present invention.

Reference is made to FIG. 7, which is a simplified diagram of a method for network surveillance using two-factor deception, in accordance with an embodiment of the present invention. At operation 1310 an attacker accesses a computer A of network 200. At operation 1320 the attacker obtains decoy credentials for accessing a computer B of network 200, the decoy credentials being of the form<username> <hash>, where <hash> is a hash value of a cleartext password. The decoy credentials are preferably planted in computer A such that the chances of a valid user or automated monitor accessing the credentials are low.

At operation 1330 the attacker derives the cleartext password from <hash>. Operation 1330 may be performed by rainbow tables, which are pre-computed tables for reversing cryptographic hash functions. At operation 1340 the attacker attempts a login to computer B using the cleartext version of the decoy credentials<username> <cleartext password>. At this stage, the chances of such login being performed by a valid user or automated monitor are extremely low, since this login requires two suspicious factors; namely, (i) extracting the decoy credentials with the hash value of the cleartext password from computer A, and (ii) reversing the extracted hash value to obtain the cleartext password.

It will be appreciated by those skilled in the art that the two-factor method shown in FIG. 7 can be extended to more than two factors by successively planting a trail of decoy credentials that lead from one computer to the next.

Attack Surface Management

An "attack surface" is the set of all attack vectors existing within an organization's network, that an attacker can use to accomplish his objective. "Attack surface management" (ASM) refers to mitigating an organization's vulnerabilities in a pre-breach stage, before an attacker breaks into the organization's network.

ASM sanitizes the organization by ensuring that lateral attack vectors are not available for an attacker to exploit, if he is able to gain entry into one or more hosts of the organization's network. ASM continually monitors artifacts that may have been left on network devices, which could be exploited by an attacker. The organization's employees use applications and share data, and they leave behind "access footprints" such as credentials and connections to other systems; e.g., domain administration credentials of an IT person that are retained in system memory following a remote support session, or a saved SSH connection, or a history entry in a browser.

Organizations lack (i) visibility into proliferation of credentials and connections, (ii) the ability to easily detect violations of scale, (iii) risks that credential and connection violations pose to critical business assets, and (iv) the ability to demonstrate to auditors, regulators and business leaders, the results of due diligence efforts to maintain cyber hygiene.

Figure 8:
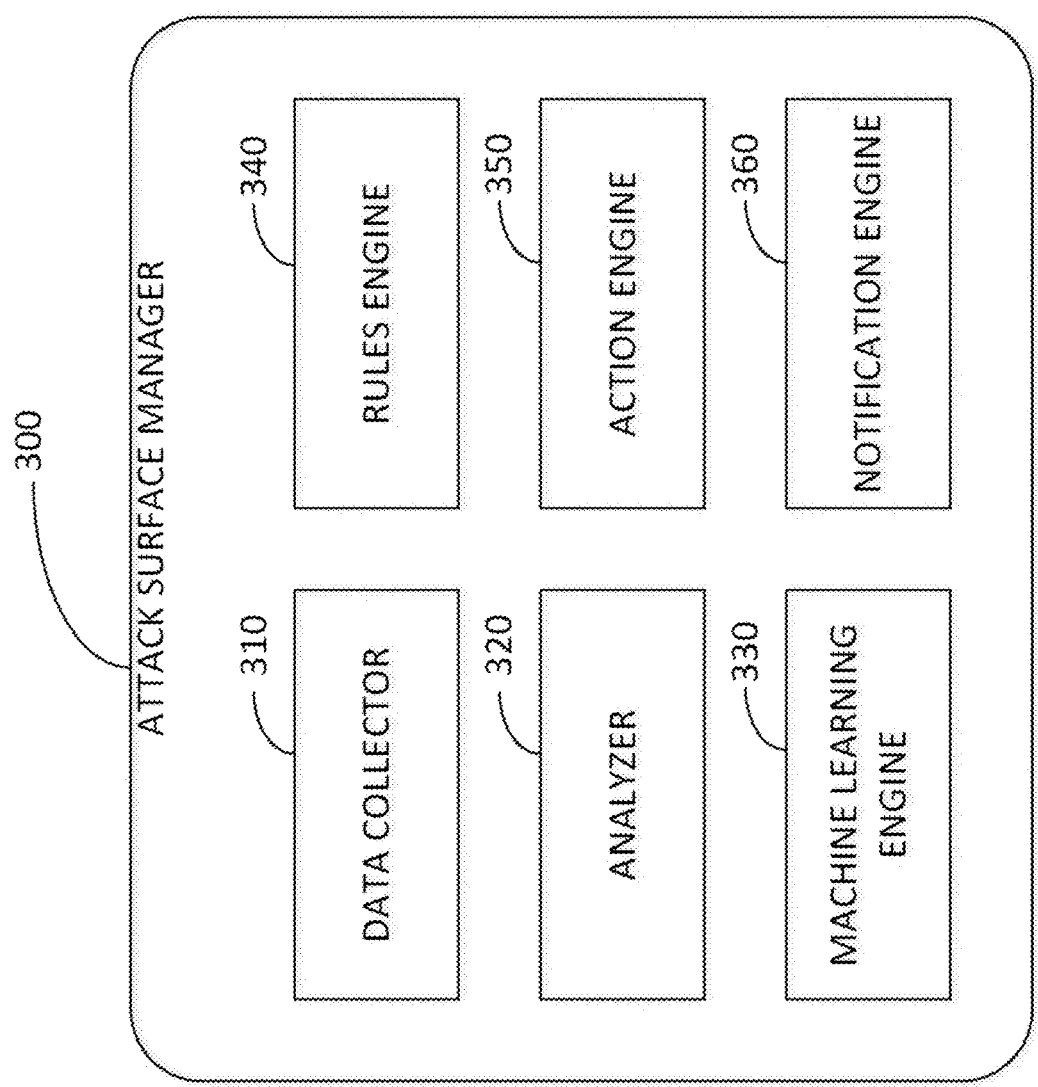
FIG. 8 is a simplified block diagram of an attack surface management module, in accordance with an embodiment of the present invention.

Reference is made to FIG. 8, which is a simplified block diagram of ASM module 300, in accordance with an embodiment of the present invention. ASM module 300 may reside within management server 210, or elsewhere within the organization's network 200.

ASM module 300 includes six primary components; namely, a data collector 310, an analyzer 320, a machine learning engine 330, a rules engine 340, an action engine 350 and a notification engine 360. Data collector 310 gathers information about hosts, including endpoint computers and server computers, and about credentials stored on these computers. Analyzer 320 applies graph theory to construct the network topology and connections between hosts, depicting hosts that store credentials. Machine learning engine 330 categorizes the hosts into users, groups and organizational units, and identifies key assets, referred to herein as "crown jewels". Rules engine 340 generates security rules prescribing on which specific hosts specific credentials are permitted to be stored. Action engine 350 applies actions to remove credentials and information about connections that are in violation of the security rules. Action engine 350 may user the Attacker View to identify and enforce these security rules. Finally, notification engine 360 generates a report of all changes applied by security rule implementation, and all security rule violations that have been eliminated.

Credentials are the means of access that advanced attackers must have once inside the network, to move laterally toward their targets. ASM automatically exposes credential violations and provides immediate corrective action. ASM enables security teams to proactively control the proliferation of credentials that otherwise occurs as part of an organization's routine business activity. By automatically exposing credential violations and enabling instant corrective action, ASM deprives attackers of the keys they need to reach critical assets, thereby making the environment more resistant to advanced, targeted attacks.

ASM provides (i) real-time threat visualization, allowing an organization to monitor its network attack surfaces, (ii) eliminate attack vectors by use of security rules and actions, and (iii) maintain a sanitized network, even when the organization changes; e.g., a merger or acquisition occurs, and/or new offices and new services are introduced into the organization.

Actions are operations that remove/delete credentials. Actions include inter alia:
- remove/delete credentials from memory;
- remove/delete credentials from browsers;
- remove/delete credentials from a single host remotely;
- remove/delete credentials from a group of hosts remotely;
- remove/delete credentials from an organizational unit, a group of organizational units or the entire organization;
- remove/delete credentials from FTP applications;
- remove/delete credentials from SSH applications;
- remove/delete credentials from credential managers;
- remove/delete credentials from Windows Registry;
- remove/delete credentials directly using Attacker View;
- manual removal/deletion; and
- automatic removal/deletion through ASM rules.

Figure 9:
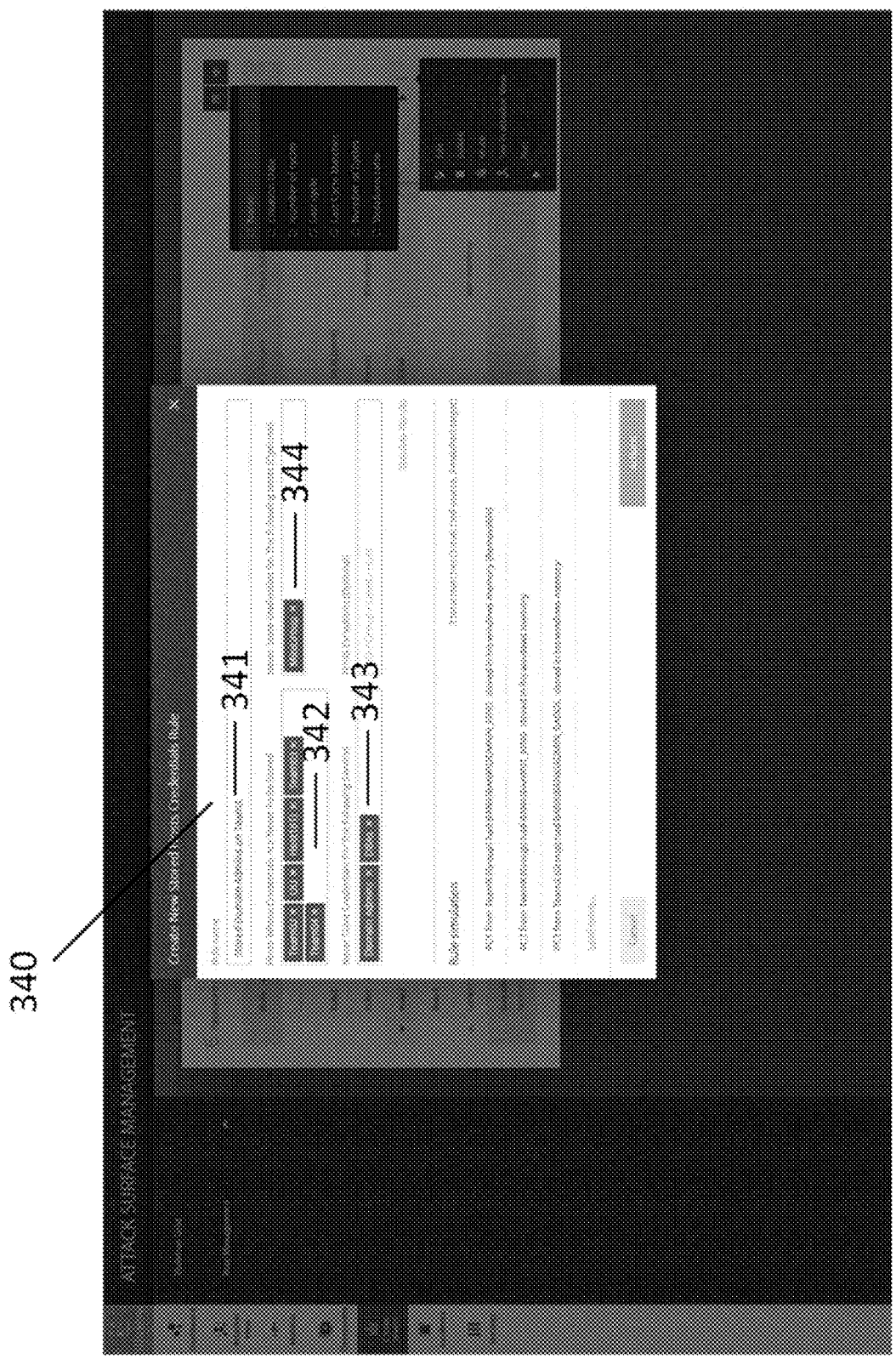
FIG. 9 is an exemplary screen shot of a rule engine for setting rules to be continuously enforced, in accordance with an embodiment of the present invention.

Rules are sanitation policies set by an organization, in order to mitigate attacker breach. Reference is made to FIG. 9, which is an exemplary screen shot of Rule Engine 340 for setting security rules to be continuously enforced, in accordance with an embodiment of the present invention. Rule Engine 340 includes automatically populated and manually defined security rules, simulation support for security rule staging and tuning, support for SIEM events, and support for automatic clean-up actions.

FIG. 9 shows an exemplary security rule 341 named "Stored Domain Admins on TeamX", governing where credentials for domain administrators are permitted to be stored. As shown at 342, this security rule forbids credentials for hosts Team02, Team03 and Team04, HOST(IT) and organizational unit OU to be stored anywhere in the network. Any such credentials stored are in violation of this security rule. The security rule also dictates at 343 that credentials for users who are domain administrators and/or database administrators are never to be stored, and at 344 that credentials of any type are never to be stored on host MiniGroup.

Manual security rules are defined based on organizational knowledge and experience. Automatically populated security rules are spawned through the Analyst Dashboard and Attacker View, and are populated with the relevant crown jewels credentials, and with hosts and organizational units. Analysts, while creating security rules, go through a simulation mode, in which the security rule is not promoted to production at first, but instead the security rule is run across existing offline data to expose the number and types of matches it will yield.

Based on data currently collected from the organization's endpoints by data collector 310, analyzed by analyzer 320 and categorized by Machine Learning Engine 330, Rule Engine 340 parses the data and maps it based on discovered violations.

Security rules support the following actions: (i) eliminate attack vectors that match a security rule, (ii) send violations to SIEM, and (iii) send email.

Figure 10:
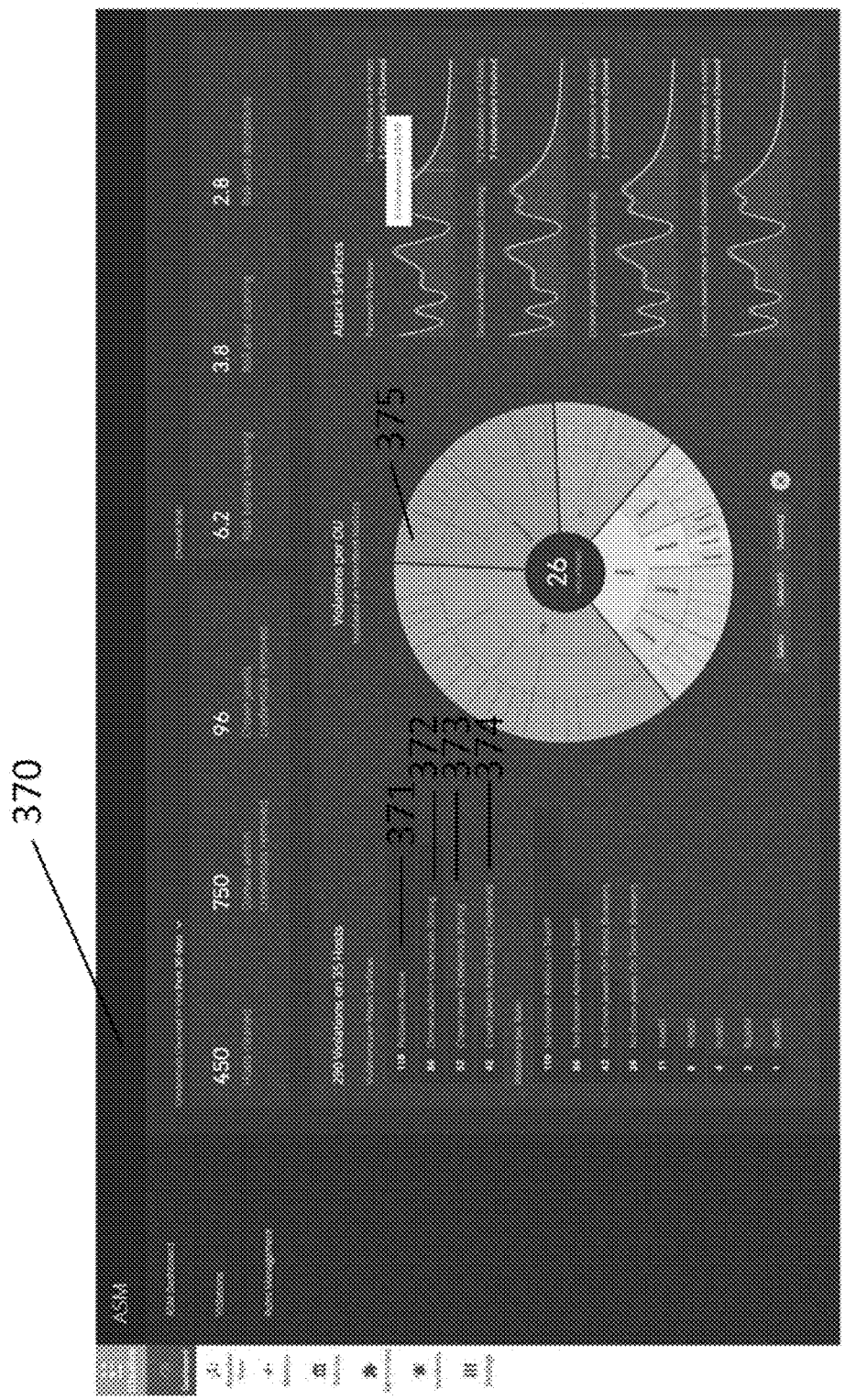
FIG. 10 is an exemplary screen shot of a user interface, referred to as an Analyst Dashboard, in accordance with an embodiment of the present invention.

Reference is made to FIG. 10, which is an exemplary screen shot of a user interface, referred to as an ASM Analyst Dashboard 370, in accordance with an embodiment of the present invention. Analyst Dashboard 370 provides cross-organization visibility, and is an interactive tool to monitor security rule violations over time, and to monitor effectiveness of actions.

Analyst Dashboard 370 visualizes the organization and its sub-departments, including all activities and violations in the organization across its different departments. Analyst Dashboard 370 identifies potential problem areas and is used to generate security rules. Analyst Dashboard 370 infers security rules, and automatically populates security rules in the context of the analyst activities. Analyst Dashboard 370 is an interactive canvas that visualizes all clean-up activities, violations, potential attack vectors across surfaces, and monitors progression made by the security team. Analyst Dashboard 370 is automatically populated once the system is turned on, before security rules are set.

As shown in FIG. 10, the Analyst Dashboard indicates that there are currently 290 security rule violations, 361-367, on 35 hosts, comprising 110 instance of password reuse, 86 domain administration credentials stored, 52 crown jewels credentials stored, and 42 newly stored crown jewel connection. Analyst Dashboard 370 also indicates that there are 26 organizational units in violation of the security rules 367.

Figure 11:
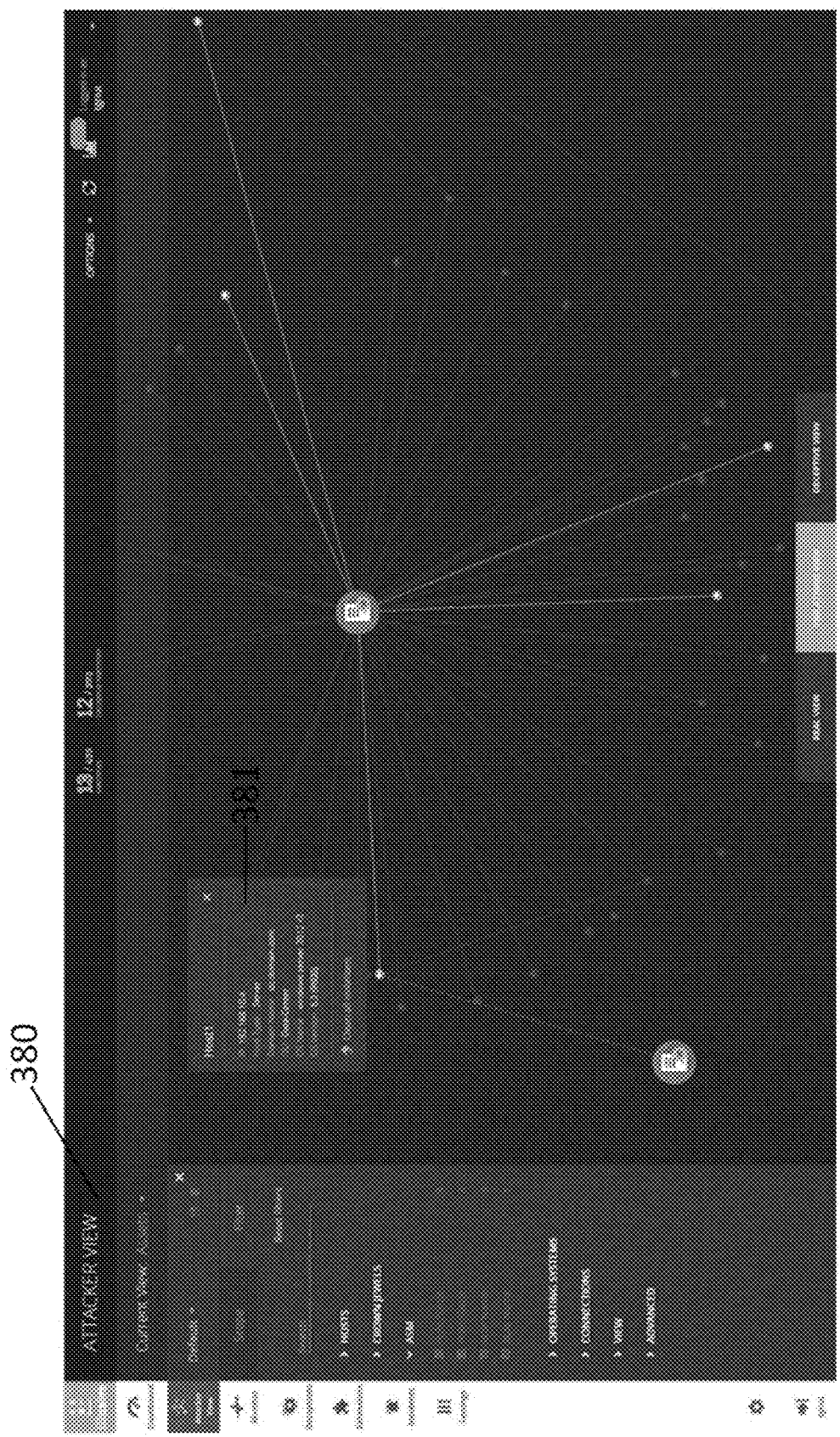
FIG. 11 is an exemplary screen shot of a user interface, referred to as an Attacker View, in accordance with an embodiment of the present invention.

Reference is made to FIG. 11, which is an exemplary screen shot of a user interface, referred to as an ASM Attacker View 380, in accordance with an embodiment of the present invention. Attacker View 380 is used to show specific violations. Attacker View 380 includes a tool to identify the effects of violations, with access to actions to fix the identified violations. Violations may be fixed individually, or in bulk. Attacker View 380 enables a security team to focus on specific areas of the organization, such as organizational units, labels and user groups, and to visualize the available relationships, some of which are legitimate and others of which are in violation of the organization's policy.

Attacker View 380 includes a "snapshot mode", wherein analysts clean an environment, and create a rule to keep the environment clean without further analyst involvement.

Figure 12:
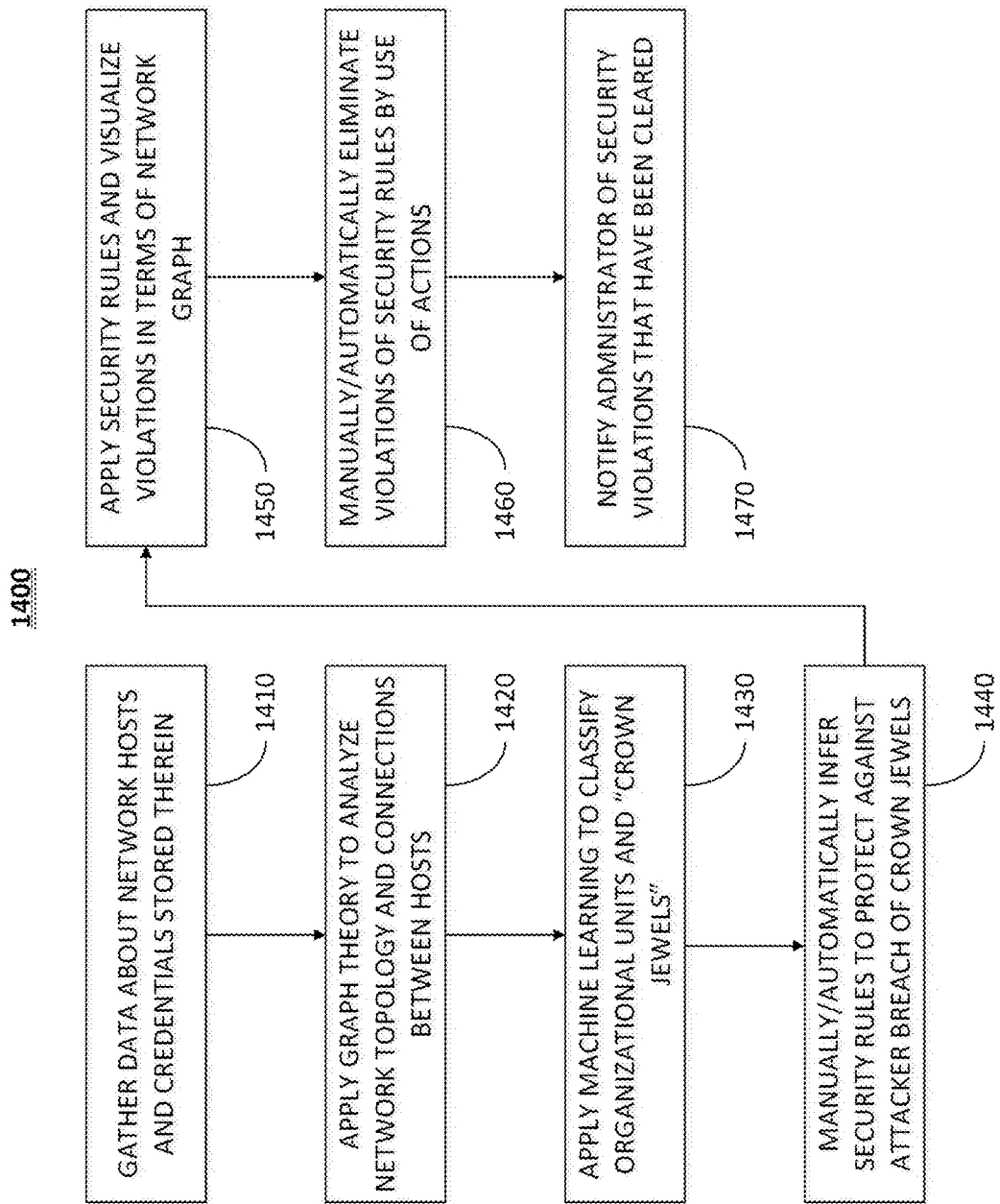
FIG. 12 is a method for attack surface management, in accordance with an embodiment of the present invention.

Reference is made to FIG. 12, which is a method for attack surface management, in accordance with an embodiment of the present invention. At operation 1410 data collector 310 gathers data about network hosts and credentials stored therein. At operation 1420 analyzer 320 applies graph theory to analyze network topology and connections between hosts. At operation 1430 machine learning engine 330 classifies the organization's network into organizational units, and identifies key assets (crown jewels).

At operation 1440 rule engine 340 manually and/or automatically infers security rules to protect the organization against attacker breach of crown jewels. At operation 1450 attacker view 380 enables an administrator to apply security rules and to visualize security violations in terms of the network graph. At operation 1460 action engine 350 enables an administrator to manually and/or automatically eliminate the security violations on an individual or a bulk basis by use of actions. Finally, at operation 1470 notification engine 360 notifies an administrator of the security violations that have been cleared.

As such, it will be appreciated that ASM provides many advantages to an organization, including inter alia:
- Credential sanitation across browsers and various additional locations: ASM ensures that only certain groups, organization units and hosts are permitted to store credentials to specific crown jewels and information about domain users. ASM ensures that no user saves passwords to specific servers in a host memory or browser.
- Sensitive domain credentials in LSASS: ASM protects access to the sensitive domain credentials.
- First time host/user with credentials allowing access to crown jewels: ASM alerts security teams to hosts that store credentials allowing access to crown jewels, for the first time.

Local administrators: ASM monitors for local administrators that increase the attack surface by enabling attackers to move laterally.

Identity reuse: ASM monitors passwords that are reused across public sites and crown jewels, so that administrators can ensure that passwords that were leaked and may be found in threat intelligence feeds or used for access to social websites such as FACEBOOK®, are different than passwords used for database access and for SWIFT applications.

Credential roaming: Monitor credentials from one department found within a department with which they have no activity, such as HR credentials found in a finance department or in an R&D department.

Shadow administration: Shadow administrators are users who have powerful credentials, but are not domain administrators. Shadow administrators have privileges equivalent to domain administrators, but those accounts are not as monitored by security teams. As such an attacker obtaining shadow administration credentials could have domain dominance without being detected or noticed. ASM identifies such credentials and highlights them for the administrators.

Stored credentials for external domains: Credentials between separated areas of an organization are suspicious. ASM monitors for such anomalies and informs the administrators.

Unauthorized applications: ASM continually monitors for applications installed in the organization and for whitelist authorized applications, and alerts administrators of violations.

ASM also addresses the problem of "derivative paths" to crown jewels. A derivative path to an asset is an attack path used by an attacker to move laterally within the organization's network toward the asset, by use of a combination of indirect privileges. E.g., an attacker may land on resource A, but only resource B has access to crown jewels. Since resource A has no administration privileges to resource B, the attacker breaches resource C, which does have administrative privileges to resource B. The attacker can then traverse the path A→C→B→ crown jewels ASM is able to identify that resource C has a derivative path to crown jewels, to alert and to clear that path, by inter alia eliminating the credentials on resource A that lead to resource C, and/or by eliminating the administration privileges on resource C for resource B.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for sanitizing an organization's network against attacker breach, comprising:
   a data collector, gathering information about network hosts, including endpoint computers and server computers within an organization's network, and about credentials stored on these computers, the credentials being used to grant users access to hosts;
   an analyzer applying graph theory to construct the organization's network topology and connections between hosts, and to depict hosts that have credentials stored therein;
   a machine learning engine categorizing the hosts into users, groups and organizational units, and identifying key assets of the organization; and
   a security rules engine mapping real-time data collected from said data collector, analyzed by said analyzer and categorized by said machine learning engine, automatically generating security rules for the organization's network, that prescribe on which specific hosts which specific credentials are permitted to be stored so as to prevent exploitation of the specific credentials in case of an attacker breach, and simulating the generated security rules for existing network data offline.

2. The system of claim 1 wherein said security rules engine implements production versions of the generated security rules.

3. The system of claim 1 further comprising a notification engine generating a report of all changes applied by security rule implementation, and all security rule violations that have been eliminated.

4. The system of claim 1 further comprising an analyst dashboard visualizing in real-time activities within the organizations' network.

5. The system of claim 4 wherein said analyst dashboard automatically generates security rules for the network.

6. The system of claim 5 wherein said analyst dashboard activates the generated security rules in the network.

7. The system of claim 6 wherein said analyst dashboard eliminates potential attack vectors for which the activated security rules are violated.

8. The system of claim 1 further comprising an attacker view visualizing the endpoints and the servers within the organization's network.

9. The system of claim 8 wherein said attacker view represents connections by protocol and by credentials within the network.

10. The system of claim 9 wherein said attacker view visualizes real and deceptive connections within the network.

11. The system of claim 10 wherein said attacker view identifies security rule violations across the organization's network.

12. The system of claim 11 wherein said attacker view enables removal of credential-based security rule violations by use of actions.

13. A method for sanitizing an organization's network against attacker breach, comprising:
    gathering information about network hosts, including endpoint computers and server computers within an organization's network, and about credentials stored on these computers, the credentials being used to grant users access to hosts;
    applying graph theory to construct the organization's network topology and connections between hosts, and to depict hosts that have credentials stored therein;
    categorizing the hosts into users, groups and organizational units, and identifying key assets of the organization;
    mapping real-time data collected from said gathering information, analyzed by said applying graph theory and categorized by said categorizing;
    automatically generating security rules for the organization's network, that prescribe on which specific hosts which specific credentials are permitted to be stored so as to prevent exploitation of the specific credentials in case of an attacker breach; and
    simulating the generated security rules for existing network data offline.

14. The method of claim 13 further comprising implementing production versions of the generated security rules.

15. The method of claim 13 further comprising generating a report of all changes applied by security rule implementation, and all security rule violations that have been eliminated.

16. The method of claim 13 further comprising:
visualizing in real-time activities within the organizations' network;
automatically inferring security rules for the network;
activating the security rules in the network; and
eliminating potential attack vectors for which the activated security rules are violated.

17. The method of claim 13 further comprising:
visualizing the endpoints and the servers within the organization's network;
representing connections by protocol and by credentials within the network; and
visualizing real and deceptive connections within the network.

18. The method of claim 13 further comprising:
identifying security rule violations across the organization's network; and
enabling removal of credential-based security rule violations by use of actions.

* * * * *